United States Patent [19]

Allen

[11] 4,186,800
[45] Feb. 5, 1980

[54] PROCESS FOR RECOVERING HYDROCARBONS

[75] Inventor: Joseph C. Allen, Bellaire, Tex.

[73] Assignee: Texaco Inc., White Plains, N.Y.

[21] Appl. No.: 871,898

[22] Filed: Jan. 23, 1978

[51] Int. Cl.$^2$ .................... E21B 43/22; E21B 43/24
[52] U.S. Cl. ........................... 166/256; 166/272; 166/273
[58] Field of Search ............... 166/256, 261, 272, 273, 166/274, 275, 303; 252/8.55 D

[56] References Cited

U.S. PATENT DOCUMENTS

| | | | |
|---|---|---|---|
| 2,734,578 | 2/1956 | Walter | 166/272 |
| 3,051,235 | 8/1962 | Banks | 166/261 |
| 3,102,588 | 9/1963 | Fisher | 166/261 |
| 3,208,514 | 9/1965 | Dew et al. | 166/272 X |
| 3,554,286 | 1/1971 | Feuerbacher et al. | 166/272 X |
| 3,731,741 | 5/1973 | Palmer et al. | 166/272 |
| 3,766,982 | 10/1973 | Justheim | 166/272 X |
| 3,948,320 | 4/1976 | Terry | 166/272 |
| 4,043,922 | 8/1977 | Palmer et al. | 166/272 X |
| 4,048,078 | 9/1977 | Allen | 166/272 X |
| 4,071,458 | 1/1978 | Allen | 166/272 X |

Primary Examiner—Stephen J. Novosad
Assistant Examiner—George A. Suchfield
Attorney, Agent, or Firm—Carl G. Ries; Thomas H. Whaley; Walter D. Hunter

[57] ABSTRACT

A process for recovering hydrocarbons from a subterranean formation in which in situ combustion is first initiated in the formation by injection of air, for example, through an injection well, the injection of air is terminated, carbon dioxide or nitrogen is injected into the formation via the injection well to displace unconsumed air and in a final step a mixture of carbon monoxide and hydrogen is injected into the formation where reaction of the carbon monoxide with steam generated from the formation water forms additional hydrogen and carbon dioxide and finally hydrocarbons are recovered via a production well.

Optionally, after injection of the mixture of carbon monoxide and hydrogen into the formation has been terminated the heat stored in the formation may be recovered by injecting water as a drive fluid into the formation. The injected water may contain a small amount of a sulfated interfacial tension reducer having, for example, the formula:

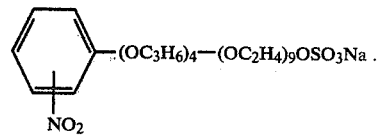

6 Claims, No Drawings

4,186,800

PROCESS FOR RECOVERING HYDROCARBONS

BACKGROUND OF THE INVENTION

1. Field of the Invention

This invention relates to a method of recovering hydrocarbons from a subterranean hydrocarbon-bearing formation. More particularly, this invention relates to a method of recovering hydrocarbons in which in situ combustion is first conducted in the formation after which a mixture of hydrogen and carbon monoxide is injected into the formation where reaction of the injected carbon monoxide and steam generated from the formation water takes place thus generating additional hydrogen and carbon dioxide and hydrocarbons are recovered from the formation via a production well.

2. Prior Art and Background

In recovery of petroleum from subterrranean reservoirs, it usually is possible to recover only a minor portion of the petroleum in place by the so-called primary recovery techniques, that is, those techniques which utilize only the natural forces present in the reservoir. Thus, a variety of supplemental recovery techniques have been developed in order to increase the recovery of petroleum in such reservoirs. In these supplemental techniques which are commonly referred to as secondary recovery operations, although they may be tertiary in sequence of employment, energy is supplied to the reservoir as a means of moving the fluid within the reservoir to suitable production wells through which they may be withdrawn to the surface of the earth.

Secondary recovery techniques which are showing increasing promise are those which involve in situ combustion. It an in situ combustion process, a portion of the carbonaceous material within the reservoir is burned or oxidized in situ in order to establish a combustion front. The combustion front may be moved through the reservoir by either a direct or inverse drive. In a drive in situ combustion process the combustion is initiated adjacent to one or more injection wells and the resulting combustion front is advanced through the reservoir in the direction of one or more production wells by the introduction of a combustion-supporting gas through the injection well or wells. The combustion front is preceded by a high temperature zone commonly called a retort zone, within which the reservoir petroleum is heated to affect a viscosity reduction and is subjected to distillation and cracking. The hydrocarbon fluids resulting from subjecting the petroleum to such a process are displaced to the production wells where they are withdrawn to the surface of the earth. In an inverse combustion drive, the combustion front is established adjacent to the production well or wells. As the combustion supporting gas is introduced through the injection well, the combustion front advances countercurrently to the flow of such gas in the direction of the injection well. The in situ combustion procedure, whether inverse of direct, is particularly useful in the recovery of thick heavy oils (petroleum) such as viscous petroleum crude oils and the heavy tar-like hydrocarbons present in tar sands. While these tar-like hydrocarbons may exist within the reservoir in a solid or semi-solid state, they undergo a sharp viscosity reduction upon heating and in an in situ combustion process they behave somewhat like the more conventional petroleum crude oil. In situ combustion also may be employed in the recovery of hydrocarbons from oil shale.

SUMMARY OF THE INVENTION

This invention provides an improved process for recovering hydrocarbons from an underground formation penetrated by an injection well and a production well which comprises:

(a) establishing a burning zone in said formation at the face of said injection well, (b) introducing a combustion-supporting gas into said formation via said injection well to propagate said zone toward said production well, (c) terminating the injection of the combustion-supporting gas into the formation, (d) displacing the unconsumed combustion-supporting gas in the formation behind the combustion zone by injecting into the formation via the injection well a gas selected from the group consisting of carbon dioxide, nitrogen or steam, (e) injecting into the said formation via said injection well a mixture of carbon monoxide and hydrogen where reaction of steam generated from the formation water with the injected carbon monoxide forms additional hydrogen and carbon dioxide, and (f) recovering the displaced hydrocarbons via the said production well.

DETAILED DESCRIPTION OF THE INVENTION

The present invention may be carried out utilizing any suitable injection and production system. The injection and production systems may comprise one or more wells extending from the surface of the earth into the subterranean reservoir. Such injection and production wells may be located and spaced from one another in any desired pattern. For example, a line drive pattern may be utilized in which a plurality of injection wells and a plurality of production wells are arranged in rows which are spaced horizontally from one another. Exemplary of other patterns which may be used are the so-called circular drive patterns in which the injection system comprises a central injection well and the production system comprises a plurality of production wells spaced about the injection well. Typical circular drive patterns are the inverted five spot, seven spot, and nine spot patterns. The above and other patterns are well known to those skilled in the art and for a more detailed description of such patterns references made to Uren, L.C., Petroleum Production Engineering-Oil Field Exploitation, Second Edition, McGraw, Hill Book Company Incorporated, New York and London, 1939. While the well paterns described in Uren are with reference to water flooding operations, it will be recognized that such patterns are also applicable to the procedure described herein.

The in situ combustion step in the process of my invention is carried out by a conventional manner using known techniques. For example, a combustion supporting gas such as oxygen as contained in air or a mixture of air and oxygen, for example, is injected into the injection well or wells and is forced through the formation to the production wells. Next, ignition of reservoir hydrocarbons and the oxygen or air and oxygen mixture is initiated by conventional methods and once combustion is attained the combustion front is propagated through the formation toward the production wells. As this in situ combustion operation proceeds, the heat from the operation lowers the viscosity of the inplace hydrocarbons which are moved toward the production wells where they are produced.

After the first step in the process of this invention, i.e., the in situ combustion step has been operated for a period of about 30 to about 120 days or more and after the combustion zone has propagated for some distance away from the well bore, i.e., from 10 to about 100 ft. or more, injection of the combustion-supporting gas, which can be air, an air and oxygen mixture, etc. is terminated and, if desired, the unconsumed combustion-supporting gas behind the combustion zone is displaced by injection into the formation via the injection well of an inert gas such as nitrogen, carbon dioxide, etc. The temperature of the formation at the conclusion of the in situ combustion step will be about 80° to about 1500° F. or more.

In the next step of the process of this invention a mixture of hydrogen and carbon monoxide, for example, as obtained from a synthesis gas generator is injected into the formation via the injection well. If a hydrogen-carbon monoxide mixture obtained from a synthesis gas generator is employed, the ratio of hydrogen to carbon monoxide by volume will depend on the type of fuel employed as feed for the generator. During the step in which the hydrogen-carbon monoxide mixture is injected, additional hydrogen and carbon dioxide are formed by reaction between the carbon monoxide and the in place steam generated from the formation water during the in situ combustion step. The advantages of carbon dioxide in recovering oil from hydrocarbon bearing formations are well known and its use as a displacement medium has been demonstrated. Carbon dioxide having a high solubility in oil causes the oil to swell and substantially reduces the oil viscosity. If desired, saturated steam, wet steam or superheated steam in an amount of from about 5 to 50 percent by volume based on the volume of the carbon monoxide-hydrogen mixture may be introduced into the formation along with the carbon monoxide-hydrogen mixture. The step of in situ combustion in which a combustion-supporting gas alone is injected into the formation and the step in which a mixture of hydrogen and carbon monoxide is injected into the formation may be repeated in a cyclic manner, as desired, in operating the process of this invention.

A preferred method of operating the in situ combustion step of the process of this invention would be to first initiate combustion for a period of about 50 to 70 days or more followed by injection via the injection well of sufficient inert gas such as nitrogen or carbon dioxide to displace the combustion-supporting gas in the formation behind the combustion zone and then injecting via the injection well a mixture of carbon monoxide and hydrogen preferably at a temperature of about 500° to about 1200° F. or more for a period of about 30 to about 60 days or more. The temperature of the inert gas introduced may be varied over a wide range of from about 80° to about 1200° F. or more and preferably will be about 1000° to about 1200° F. Generally the inert gas will be injected into the formation via the injection well for a period of about 1 to about 10 days or more.

In another embodiment of this invention the heat stored in the formation at the end of the reaction period during which the carbon monoxide injected into the formation in the hydrogen-carbon monoxide mixture reacts with the steam generated from the formation water during the in situ combustion step may be recovered by injecting water as a drive fluid into the heated formation via the injection well. The water injected into the hot formation in this step is all or partially converted into steam which displaces more of the in place oils through the formation and results in the recovery of additional oil via the production well.

If desired, the water injected via the injection well may contain from about 0.001 to about 1.0 weight percent or more of an interfacial tension reducer in order to increase the oil recovery. Alkaline fluids may also be injected via the injection well in the process of this invention. The drive water is made alkaline, if desired, by the addition of sodium hydroxide or potassium hydroxide to the water in an amount sufficient to give a concentration of about 0.01 to about 0.2 weight percent.

Interfacial tension reducers which are highly useful in the process of the invention include sulfated compounds of the formula:

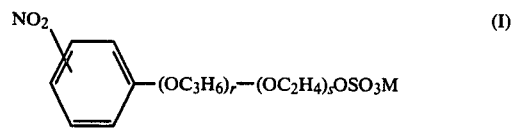

wherein r is an integer of from 2 to about 5, s is an integer of from 8 to about 60 and M is selected from the group consisting of hydrogen, sodium, potassium and the ammonium ion and compounds of the formula:

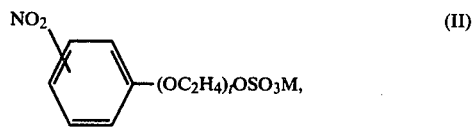

wherein t is an integer of from 8 to about 40, and M has the same meaning as previously described.

Interfacial tension reducers of this type can be formed by sulfating compounds of the formula:

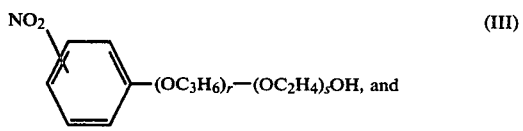

where r and s have the same meaning as before and compounds of the formula:

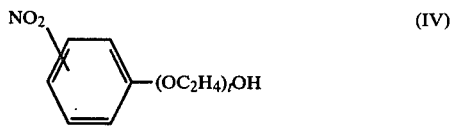

where t has the same meaning as before, batchwise with, for example, chlorosulfonic acid in a glass lined kettle at about 30° C. followed by reaction with the corresponding base, if desired.

Starting materials for the sulfated, water-soluble oxyalkylated products of this invention (Type II) can be conveniently prepared by a number of processes well known in the art. For example, ethylene oxide can be reacted with the initiator, such as para nitrophenol, ortho nitrophenol, etc., dissolved in a suitable solvent throughout which an alkaline catalyst, such as potassium hydroxide or sodium hydroxide, is uniformly dispersed. The quantity of the catalyst utilized generally will be from about 0.15 to about 1.0 percent by weight of the reactants. Preferably, the reaction temperature will range from about 80° C. to about 180° C. while the reaction time will be from about 1 to about 20 hours or more depending on the particular reaction conditions employed. This process is more completely described in U.S. Pat. No. 2,425,845.

Starting materials suitable for use in preparing the sulfated oxyalkylated nitrophenol compounds (Type I) useful in the process of this invention include oxyalkylated derivatives containing block polypropylene and polyethylene groups having the formula:

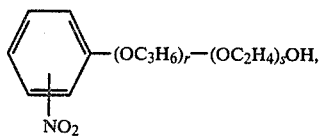

where r is an integer of from 2 to about 5 and s is an integer of from 8 to about 60.

Compounds of the above formula can be prepared by well known methods such as taught, for example, in U.S. Pat. Nos. 3,062,747; 2,174,761 or 2,425,755. In general, the procedure consists in condensing a nitrophenol with propylene oxide in the presence of an oxyalkylation catalyst until the required amount of the oxide has reacted then continuing the oxyalkylated reaction with the ethylene oxide until the desired block oxyalkylated polymer is formed.

The present invention will be more fully understood by reference to the following description of one embodiment thereof. A hydrocarbon-bearing formation is penetrated by an injection well which is spaced apart from a production well. The wells are of a suitable type for carrying out a procedure of forward in situ combustion for recovering hydrocarbons from the formation. The injection well and the production well each has a casing which extends from the earth's surface down into the lower portions of the formation. The bottom of the casing of each well is sealed by a casing shoe. The injection well is equipped with tubing which extends through the well head downward to a point adjacent the lower extremity of the casing. A packer is positioned on the tubing in the injection well at a point opposite the producing formation and the casing is perforated adjacent the tubing end to provide communication with the formation. The production well has a set of perforations through the casing wall opposite the hydrocarbon bearing formation. An in situ combustion front is begun by injecting air into the tubing of the injection well and then into the formation via the casing perforations. The hydrocarbons in the reservoir are ignited by conventional techniques such as by using an electrical igniter. Air injection is continued for about 47 days and at the end of that time the air injection is terminated. Nitrogen at a temperature of 600° F. is injected via the tubing of the injection well and through the casing perforations into the formation for a period of 3 days. In the next step, a mixture of carbon monoxide and hydrogen (about 37 percent carbon monoxide by volume) at a temperature of about 650° F. is injected via the tubing of the injection well and through the casing perforations into the formation over a period of about 53 days during which time the carbon monoxide in the mixture reacts with steam generated from the formation water in the heated reservoir thus forming additional hydrogen and carbon dioxide and during this time hydrocarbons displaced through the formation enter the wellbore of the production well through the casing perforations and are recovered via the production well.

What is claimed is:

1. A process for recovering hydrocarbons from an underground formation penetrated by an injection well and a production well which comprises:
   (a) establishing a burning zone in said formation at the face of said injection well,
   (b) introducing a combustion-supporting gas into said formation via said injection well to propagate said zone toward said production well,
   (c) terminating the injection of the combustion-supporting gas into the formation,
   (d) displacing the unconsumed combustion-supporting gas in the formation behind the combustion zone by injecting into the formation via the injection well a gas selected from the group consisting of carbon dioxide, nitrogen or steam,
   (e) injecting into the said formation via said injection well a mixture of carbon monoxide and hydrogen where reaction of steam generated from the formation water with the injected carbon monoxide forms additional hydrogen and carbon dioxide, and
   (f) recovering the displaced hydrocarbons via the said production well, and wherein after step (e) there is injected into the formation via the said injection well a drive fluid comprising water containing dissolved therein from about 0.001 to 1.0 weight percent of an interfacial tension reducer selected from the group consisting of a compound of the formula:

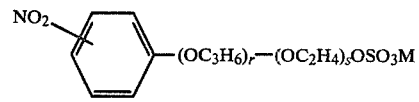

wherein r is an integer of from 2 to about 5, s is an integer of from 8 to about 60 and M is selected from the group consisting of hydrogen, sodium, potassium and the ammonium ion, and a compound of the formula:

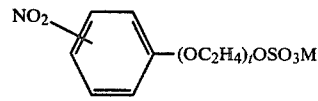

wherein t is an integer of from 8 to about 40 and M has the same meaning as previously described.

2. The method of claim 1 wherein in step (b) the combustion-supporting gas is air.

3. The method of claim 1 wherein in step (b) the combustion-supporting gas is a mixture of air and oxygen.

4. The method of claim 1 wherein in step (d) the said gas is carbon dioxide.

5. The method of claim 1 wherein in step (d) the said gas is nitrogen.

6. The method of claim 1 wherein in step (e) a mixture of carbon monoxide, hydrogen and steam is injected into the formation.

* * * * *